US012357852B2

(12) United States Patent
Voss et al.

(10) Patent No.: US 12,357,852 B2
(45) Date of Patent: Jul. 15, 2025

(54) HEIGHT SAFETY TROLLEY AND MODULAR RAIL SYSTEM

(71) Applicant: SAYFA R&D PTY LTD, Boronia (AU)

(72) Inventors: Barry Voss, Boronia (AU); Murray Voss, Boronia (AU)

(73) Assignee: SAYFA R&DPTY LTD, Boronia (AU)

(*) Notice: Subject to any disclaimer, the term of this patent is extended or adjusted under 35 U.S.C. 154(b) by 79 days.

(21) Appl. No.: 18/001,914

(22) PCT Filed: Jul. 27, 2022

(86) PCT No.: PCT/AU2022/050790

§ 371 (c)(1),
(2) Date: Dec. 15, 2022

(87) PCT Pub. No.: WO2023/004458

PCT Pub. Date: Feb. 2, 2023

(65) Prior Publication Data

US 2024/0100374 A1 Mar. 28, 2024

(30) Foreign Application Priority Data

Jul. 29, 2021 (AU) ................................ 2021902342

(51) Int. Cl.
*A62B 35/00* (2006.01)
*E04G 21/32* (2006.01)

(52) U.S. Cl.
CPC ...... *A62B 35/0081* (2013.01); *A62B 35/0062* (2013.01); *A62B 35/0068* (2013.01); *E04G 21/3295* (2013.01)

(58) Field of Classification Search
CPC .............. A62B 35/081; A62B 35/0062; A62B 35/0068; A62B 35/0056; E04G 21/3295
See application file for complete search history.

(56) References Cited

U.S. PATENT DOCUMENTS 4,606,430 A 8/1986 Roby et al.
5,271,481 A 12/1993 Rich
(Continued)

FOREIGN PATENT DOCUMENTS

FR 2921272 A1 3/2009

OTHER PUBLICATIONS

International Search Report & Written Opinion dated Sep. 21, 2022 from PCT Application No. PCT/AU2022/050790.
(Continued)

*Primary Examiner* — Brian D Mattei
(74) *Attorney, Agent, or Firm* — INNOVATION CAPITAL LAW GROUP, LLP; Vic Lin

(57) ABSTRACT

A height safety trolley and modular rigid rail system for construction and maintenance personnel working at height is designed to allow continuous, smooth and fail-safe operation, for fall restraint and fall arrest, rope access and abseil. The height safety trolley has a connection arm, a clip body and a main chassis operably interfacing a rail engagement mechanism, movable between a rail engagement position to engage a rigid rail, and a disengagement position to disengage the rigid rail. The rail engagement mechanism may comprise integral pivot arms which close simultaneously inwards to engage the rigid rail and outwards to disengage the rail. As such, the trolley is easily and safely attachable and detachable at any position along the rigid rail.

23 Claims, 10 Drawing Sheets

(56) References Cited

U.S. PATENT DOCUMENTS

| | | | | |
|---|---|---|---|---|
| 8,056,676 | B2 * | 11/2011 | Argoud .............. | A62B 35/0081<br>182/36 |
| 2011/0203870 | A1 | 8/2011 | Blomberg et al. | |
| 2021/0128956 | A1 * | 5/2021 | Novotny ............ | A62B 35/0056 |

OTHER PUBLICATIONS

International-type Search dated Sep. 22, 2021 from Australian Application No. 2021902342.

* cited by examiner

HEIGHT SAFETY TROLLEY AND MODULAR RAIL SYSTEM

FIELD OF THE INVENTION

This invention relates generally to a fall restraint and fall arrest, rope access and abseil height safety trolley and modular rigid rail system for construction and maintenance personnel working at height on buildings and structures.

SUMMARY OF THE DISCLOSURE

There is provided herein a height safety trolley and modular rigid rail system for construction and maintenance personnel working at height, designed to allow continuous, smooth and fail-safe operation, for fall restraint and fall arrest, rope access and abseil.

The height safety trolley has a connection arm, a clip body and a main chassis operably interfacing a rail engagement mechanism movable between a rail engagement position to engage a rigid rail, and a disengagement position to disengage the rigid rail. The rail engagement mechanism may comprise pivot arms which close simultaneously inwards to engage the rigid rail or outwards to disengage the rail. As such, the trolley is easily and safely attachable and detachable at any position along the rigid rail.

The trolley may comprise a fail-safe feature wherein the clip body cannot be disengaged when a user is tethered to the trolley by conventional safety hardware such as a carabiner and lanyard, energy absorber and body harness. Specifically, the clip body may move respect to the connection arm to define a functional gap therebetween, and wherein the clip body operably interfaces the rail engagement mechanism so that the rail engagement mechanism cannot be disengaged when the functional gap is greater than a threshold. As such, a twist lock carabiner or the like attached to the connection arm maintains the functional gap greater than the threshold to prevent the rail engagement mechanism from disengaging inadvertently when a user is tethered by the carabiner to the trolley.

The clip body may push four locking dowel pins through main chassis guide channels into aligned pivot arm guide channels to hold the pivot arms in the closed position. Two safety latches with bevelled edges may hold the clip body engaged, but distal ends of the locking dowel pins may remain in place within the pivot arm guide channels even if the safety latches inadvertently disengage.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying representative illustrations in which.

DESCRIPTION OF EMBODIMENTS

Figure 1:
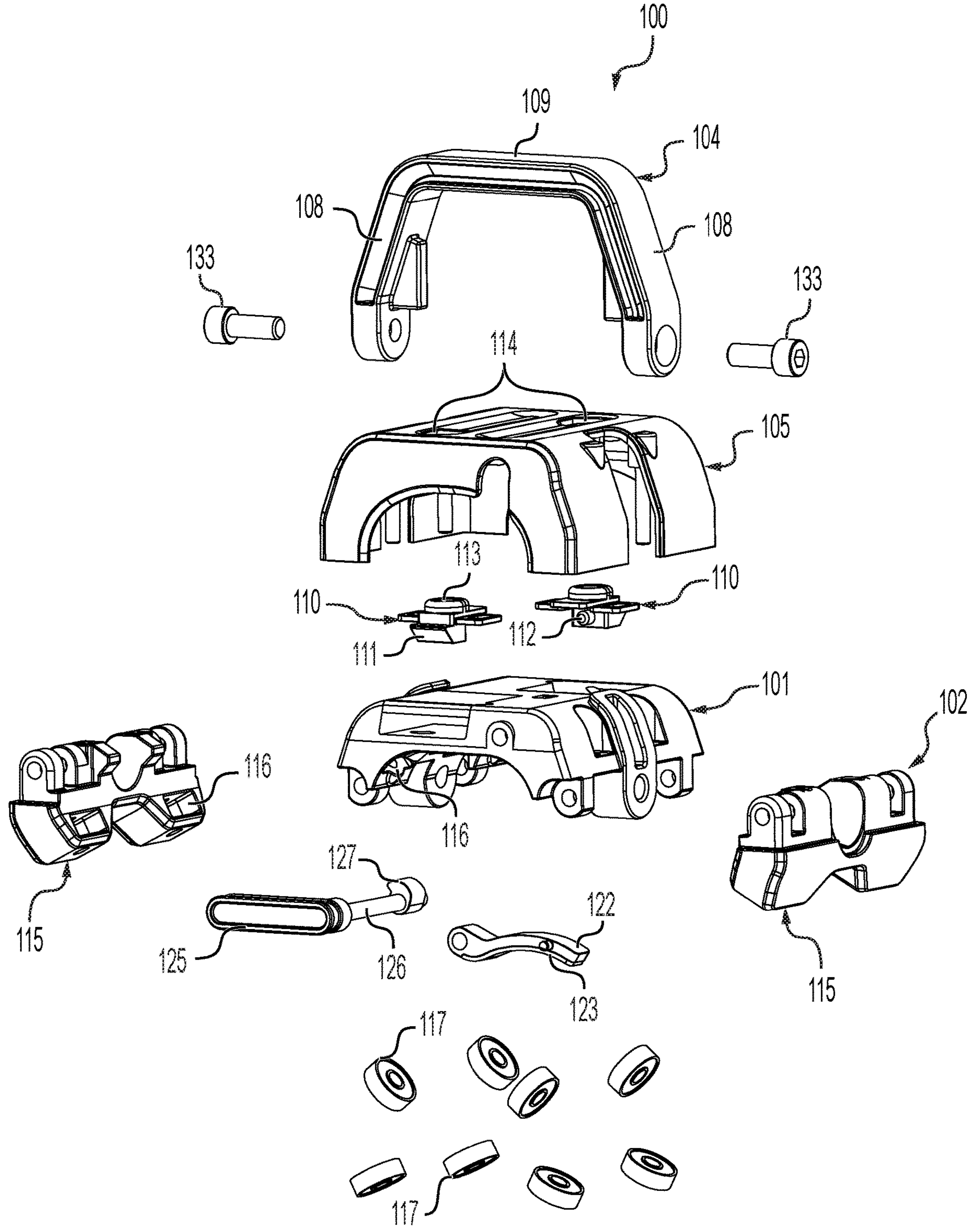
FIG. 1 shows an exploded perspective representation of a fall restraint and fall arrest, rope access and abseil height safety trolley in accordance with a first embodiment.
Figure 2:
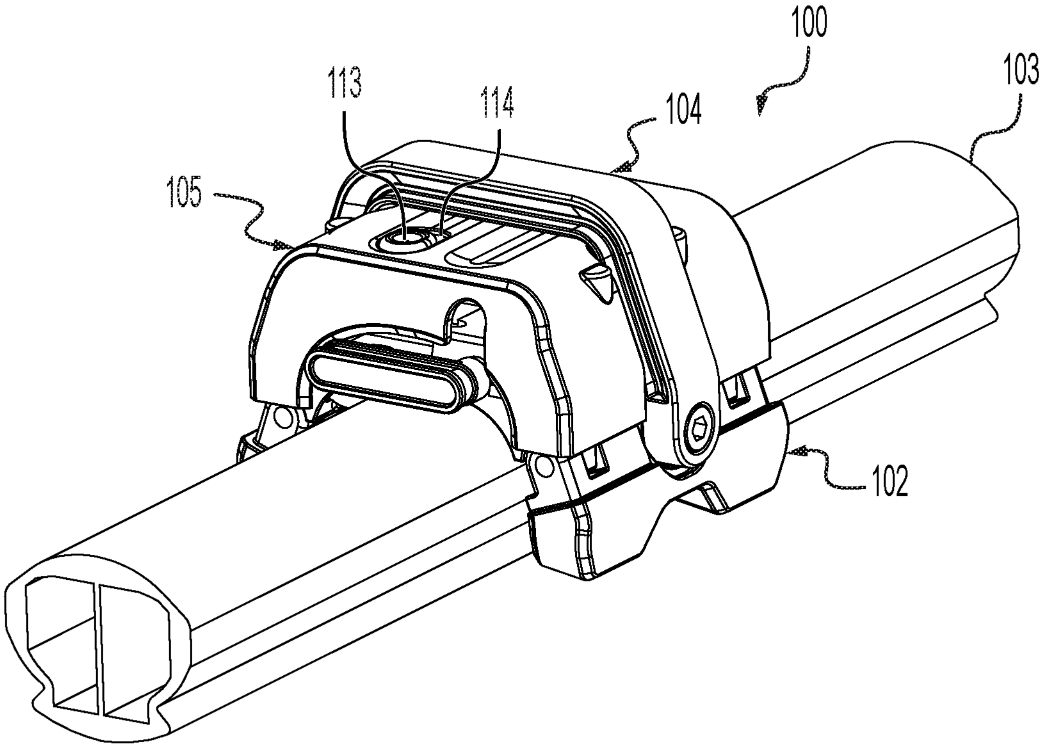
FIG. 2 shows a perspective view of the height safety trolley and modular rigid rail system in the rail disengagement position.
Figure 3:
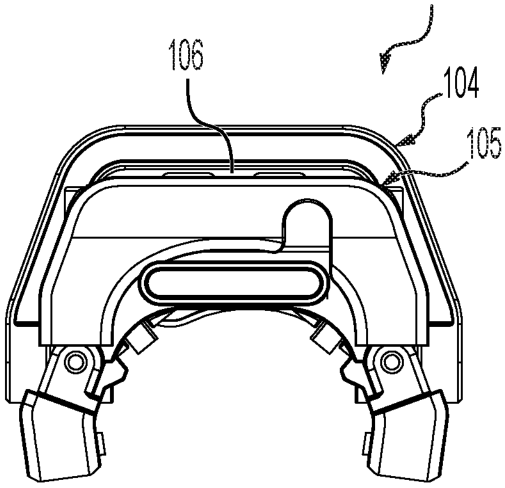
FIG. 3 shows an end view of the trolley in the rail disengagement position.
Figure 5:
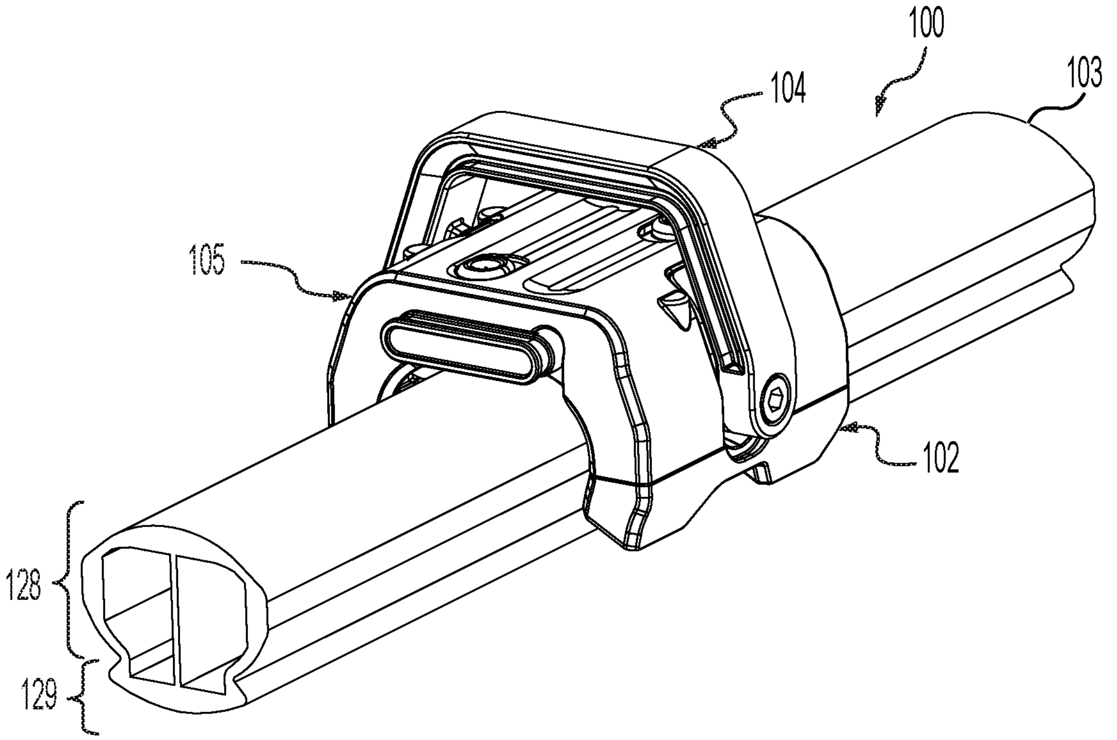
FIG. 5 shows a perspective view of the height safety trolley and modular rigid rail system in the rail engagement position.

With reference to FIG. 1, a fall restraint and fall arrest, rope access and abseil trolley 100 comprises a main chassis 101 having an engagement mechanism 102, operable in a rail engagement position shown in FIG. 5 to engage an aluminium extrusion rigid rail 103, and a rail disengagement position shown in FIG. 2 to disengage a rigid rail 103. The chassis 101 and/or the engagement mechanism 102 may be a die-cast alloy.

The trolley 100 further comprises a connection arm 104 connected to the main chassis 101. The connection arm 104 may be forwarded aluminium. A lanyard attachment point (not shown) may further be affixed to the connection arm 104, whereby a user may tether a carabiner and a lanyard attached to a safety container housing tools and equipment for rope access maintenance operations. The lanyard attachment point may be stainless-steel.

The trolley 100 further comprises a cast aluminium safety attachment clip body 105 operably interfacing the main chassis 101 and the rail engagement mechanism 102.

The clip body 105 is movable downwards or upwards with respect to the connection arm 104 between a rail engagement position shown in FIG. 5, wherein the clip body 105 holds the rail engagement mechanism 102 in the rail engagement position, and a rail disengagement position shown in FIG. 2 wherein the clip body 105 allows the rail engagement mechanism 102 to assume the rail disengagement position.

As shown in FIGS. 3, 4, 6 and 7, the clip body 105 is movable upwards or downwards with respect to the connection arm 104 to define a functional gap 106 therebetween. The trolley 100 may be configured so that the rail engagement mechanism 102 cannot assume the rail disengagement position if the functional gap is greater than a threshold, such as of greater than one centimetre.

Figure 8:
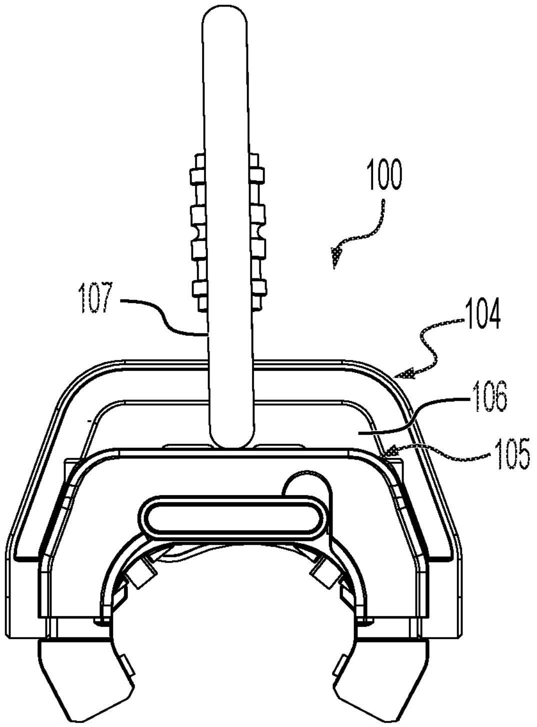
FIG. 8 shows an end view of the trolley wherein a twist lock carabiner connected thereto prevents the trolley from disengaging in event of a fall restraint or fall arrest situation.
Figure 9:
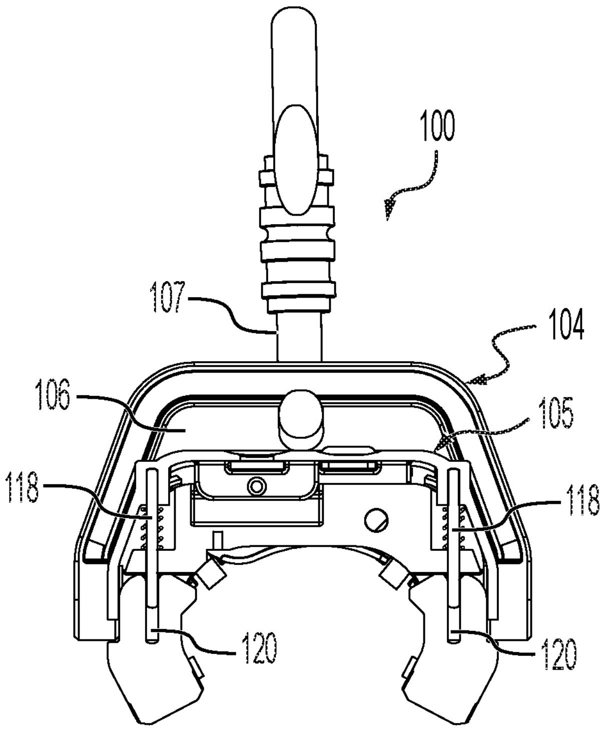
FIG. 9 shows a cross-sectional end view of the embodiment of FIG. 8.
Figure 10:
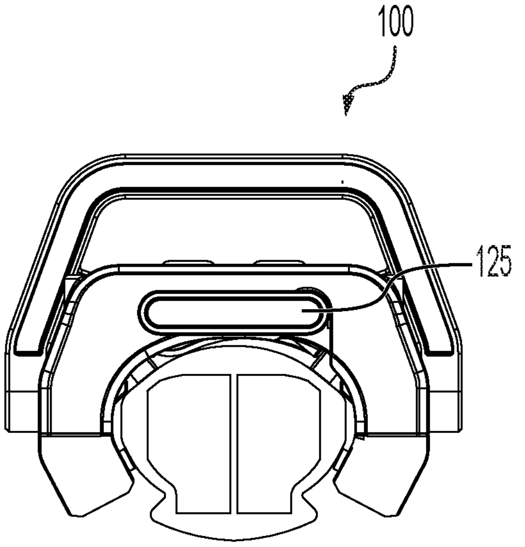
FIG. 10 shows an end view of the trolley wherein the dual braking mechanisms are disengaged.

As shown in FIGS. 8 and 9, when a stainless steel twist lock carabiner 107 or the like is attached to the connection arm 104, the carabiner 107 prevents the clip body 105 moving upwards against the connection arm 104 to close the functional gap 106, thereby allowing the rail engagement mechanism 102 to assume the rail disengagement position, and consequently providing a fail-safe feature when a user is tethered to the trolley 100 by conventional safety hardware.

As further shown in FIG. 1, the connection arm 104 may be generally handle shaped defining side portions 108 and a cross portion 109. The side portions 108 may be secured to the main chassis 101 by means of two side retention stainless steel allen screws 133.

The clip body 105 may take the form of a protective cowl which generally covers the main chassis 101. The connection arm 104 and the clip body 105 may therefore define parallel planar surfaces across the trolley 100, defining the functional gap 106 therebetween and thereby allowing for the positioning of the twist lock carabiner 107 either side of the trolley 100.

Two safety latches 110 may operably interface between the clip body 105 and the main chassis 101, to hold the clip body 105 securely in the rail engagement position. The safety latches 110 may automatically engage when the clip body 105 moves to the rail engagement position. As shown in FIG. 1, the safety latches 110 may move with the clip body 105 and may comprise bevelled edges 111, which interface with corresponding edges of the main chassis 101 to lock safely in place. The safety latch 110 may comprise an extension engagement spring 112 to bias the safety latch 110 into the latched position, thereby preventing incorrect attachment to the rigid rail 103.

In the embodiment shown in FIG. 1, the safety latch 110 comprises a round release knob 113 accessible via an ovular aperture 114 through the clip body 105, to allow manual disengagement. The trolley 100 may comprise two safety latches 110 wherein the two round release knobs must simultaneously be manually operated in opposite directions, to disengage the clip body 105 from the main chassis 101.

The rail engagement mechanism 102 may each comprise two pivot arms 115 pivotally coupled to the main chassis 101, which pivot inwards when in the rail engagement position and which pivot outwards when in the rail disengagement position.

Each pivot arm 115 may define two lower bearing recesses 116 for accommodating two lower roller bearings 117B with pins therein. The main chassis 101 may similarly define four upper bearing recesses 116 for accommodating four corresponding upper roller bearings 117A with pins therein. As such, when the pivot arms 115 pivot inwardly the lower roller bearings 117 are constrained inwards with respect to the upper roller bearings 117, thereby enclosing around the rigid rail 103 to effect the rail engagement position. The offset interfacing of the multiple lower and upper roller bearings 117 with the rigid rail 103, ensures smooth travel of the trolley 100 at any load angle.

Figure 4:
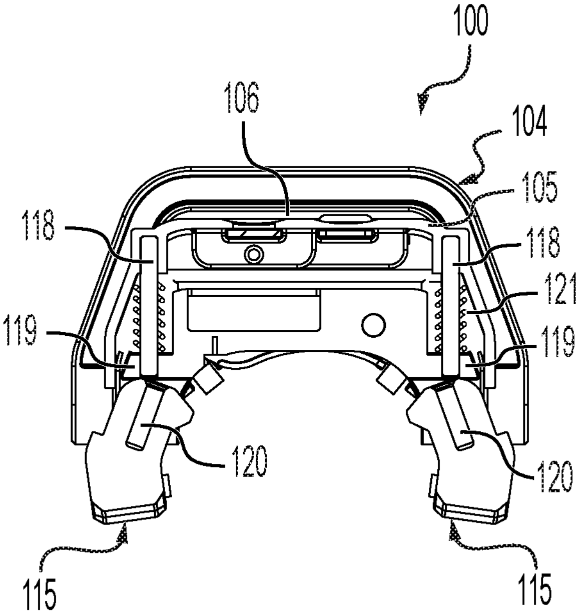
FIG. 4 shows a cross-sectional end view of the trolley in the rail disengagement position.
Figure 7:
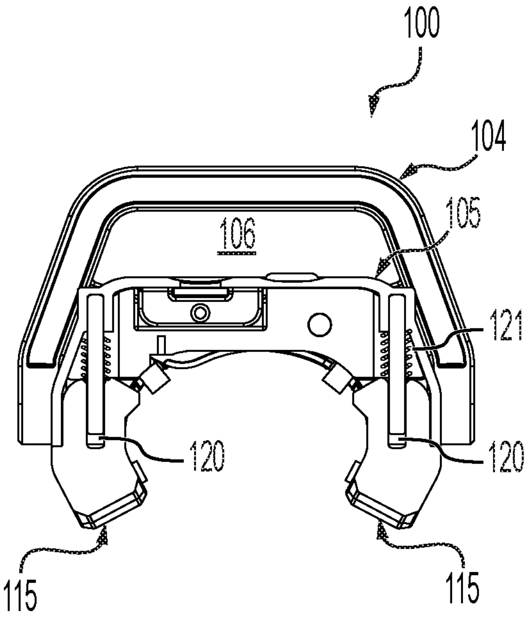
FIG. 7 shows a cross-sectional end view of the trolley in the rail engagement position.

As shown in FIGS. 4 and 7, four locking dowel pins 118 may be pushed downwards by the clip body 105 through the main chassis guide channels 119, into the aligned pivot arm guide channels 120 to securely hold the pivot arms 115 in the rail engagement position.

A plurality of compression springs 121 affixed to the locking dowel pins 118 may bias the clip body 105 upwards into the disengagement position.

As further illustrated in FIG. 9, when a twist lock carabiner 107 or the like maintains a minimum functional gap between the connection arm 104 and the clip body 105, distal ends of the locking dowel pins 118 may yet extend part way into the pivot arm guide channels 120, thereby providing a fail-safe feature even if the safety latches 110 inadvertently disengage during use.

As further illustrated in FIG. 1, the trolley 100 may comprise a braking mechanism for usage in inclined locations and rope access anchorage. The braking mechanism may comprise a frictional rail brake arm 122, which frictionally engages the rigid rail 103 in use to prevent the trolley 100 from running therealong.

Figure 11:
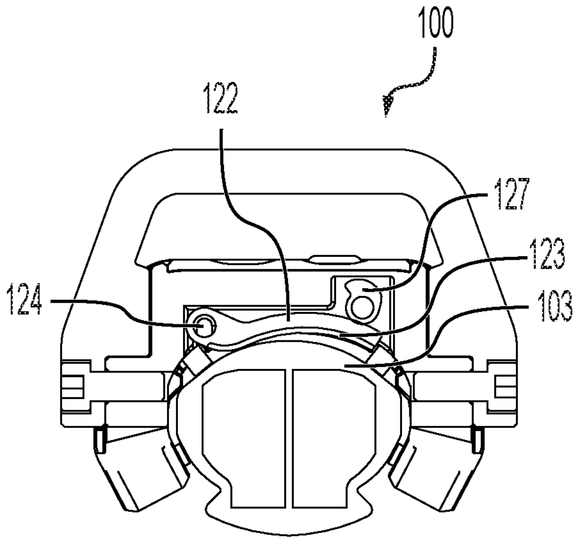
FIG. 11 shows a cross-sectional end view of the embodiment of FIG. 10.
Figure 12:
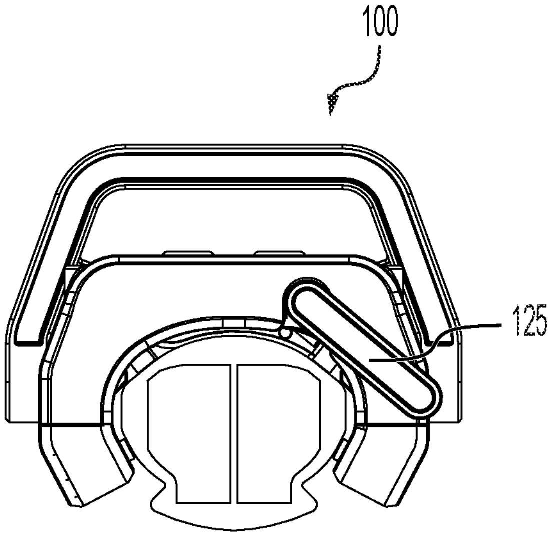
FIG. 12 shows an end view of the trolley wherein the dual braking mechanisms are engaged.
Figure 13:
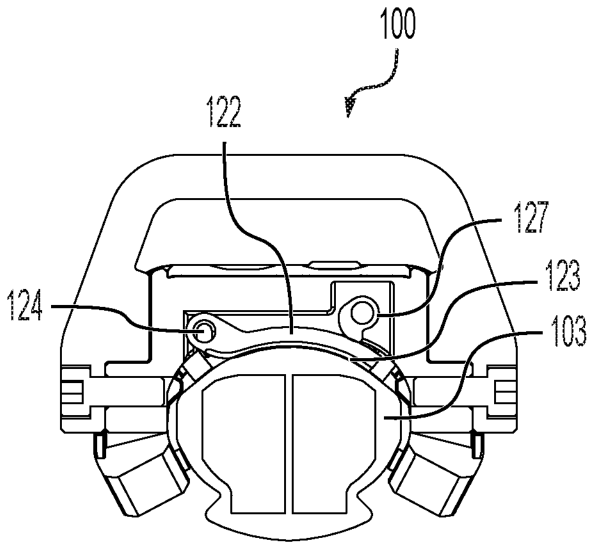
FIG. 13 shows a cross-sectional end view of the embodiment of FIG. 12.

As shown in FIGS. 11 and 13, the frictional rail brake arm 122 may conform to a curvature of the rigid rail 103 and may comprise a frictional pad 123 thereunder which frictionally engages the rail head upper portion 128 of the rigid rail 103. The frictional rail brake arm 122 may be pivotally coupled to the main chassis 101 at a pivot point 124.

The braking mechanism may comprise a cast aluminium manual braking lever 125 acting on a cam shaft 126, which turns an integral cam 127 to bear the frictional rail brake arm 122 against the rigid rail 103 in the manner shown in FIGS. 11 and 13. The manual braking lever 125 is located at one end of the trolley 100 and is easily accessible and readily engaged with clear visual markings.

Figure 6:
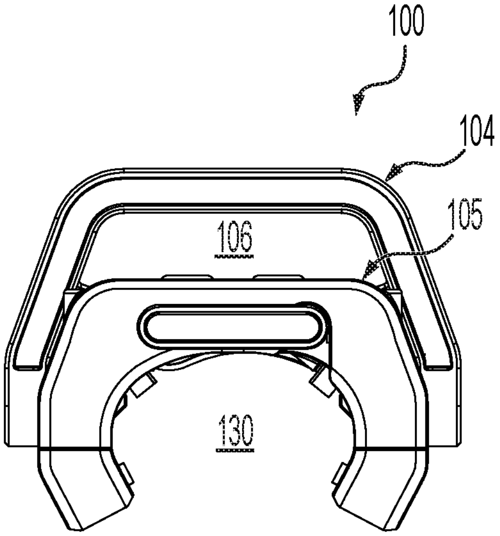
FIG. 6 shows an end view of the trolley in the rail engagement position.

As illustrated in FIGS. 6 and 7, when in the rail engagement position the trolley 100 defines a channel 130 therethrough which is non-circular in cross-section. Furthermore, the rigid rail aluminium extrusion 103 may be of a low-profile architectural form and define a rail head upper portion 128 having a non-circular cross-section conforming to the non-circular channel 130. As such, when in the rail engagement position the trolley 100 is restrained and cannot rotate with respect to the rigid rail 103.

The rigid rail aluminium extrusion 103 may further define a rail base lower portion 129, to which rail mounted clamping brackets (not shown) or the like may be affixed to support the rail head upper portion 128, for installation of the system on buildings or structures using anchor bolts or the like.

The rigid rail aluminium extrusion 103 may further span and comprise modular lengths with splice joints and end stops, intermediate and end anchorages (all not shown).

The rigid rail aluminium extrusion 103 may further be configured to facilitate usage of the system in either level or inclined locations, and around radiused corners.

Figure 14:
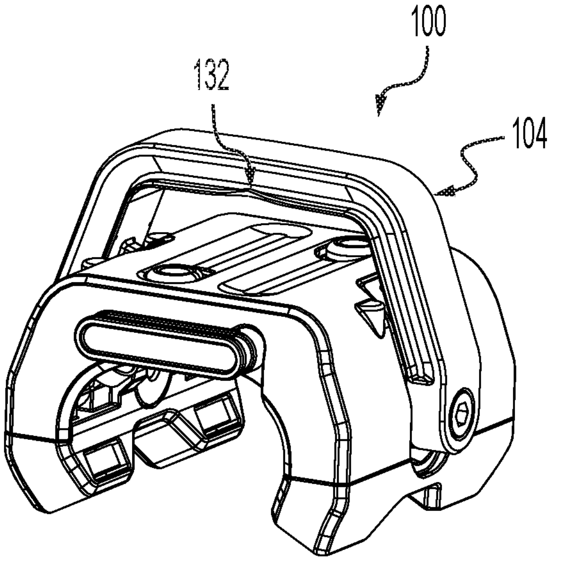
FIG. 14 shows a perspective view of the trolley wherein the connection arm thereof provides visible fall arrest indication, by means of sacrificial frail edge deformation.
Figure 15:
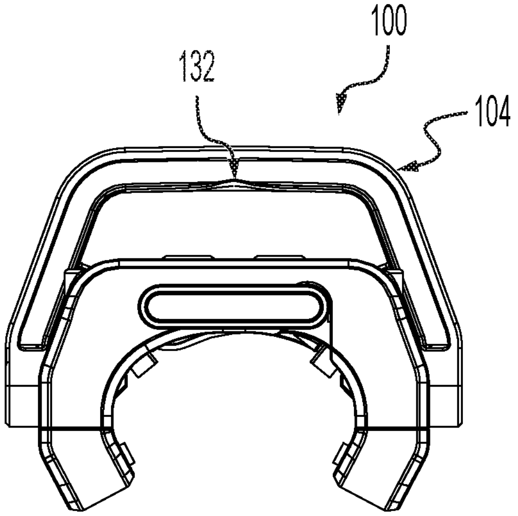
FIG. 15 shows an end view of the embodiment of FIG. 14.
Figure 16:
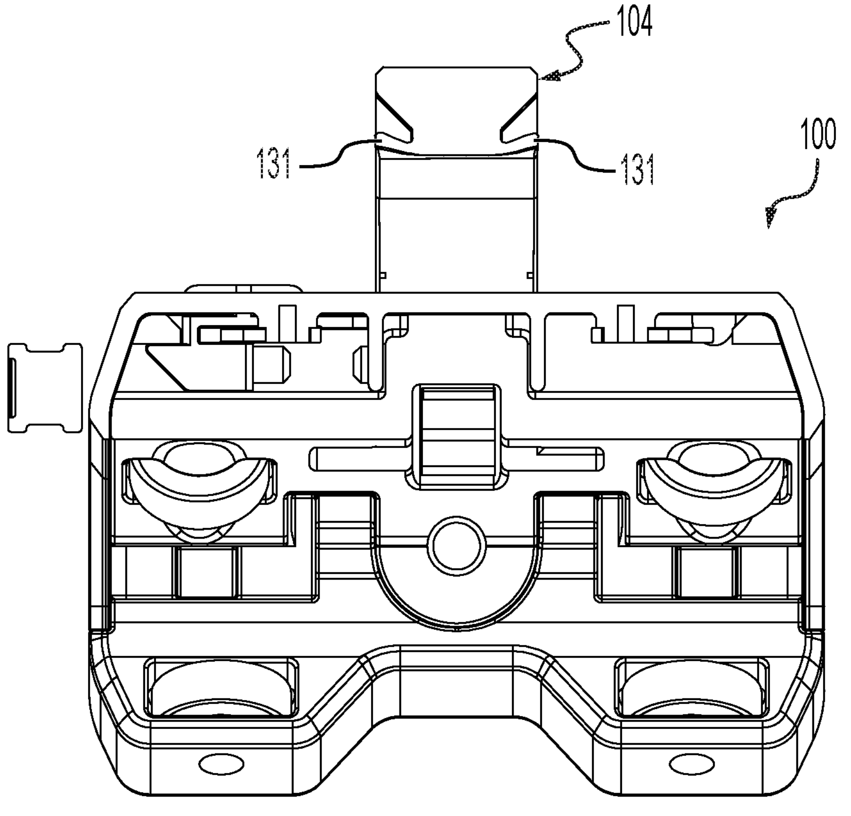
FIG. 16 shows a perspective cross-sectional bottom view of the embodiment of FIG. 14.
Figure 17:
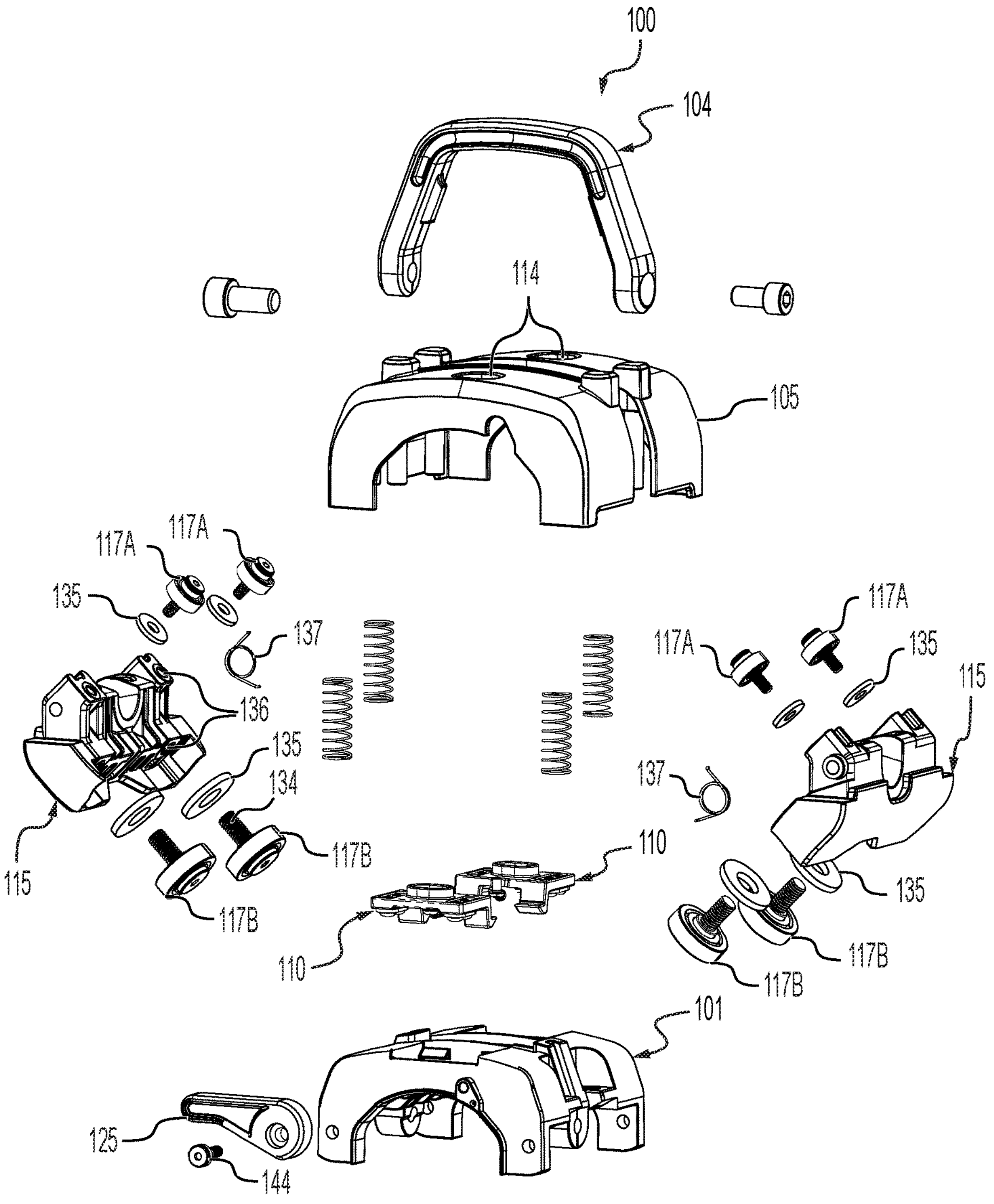
FIG. 17 shows an exploded perspective representation of a fall restraint and fall arrest, rope access and abseil height safety trolley in accordance with a second embodiment.
Figure 18:
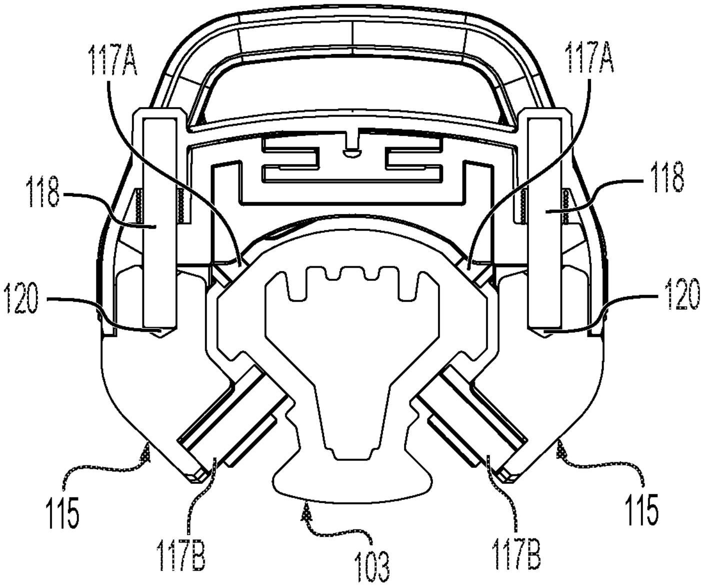
FIG. 18 shows an end cross-sectional view of the trolley of the second embodiment engaged to a rail.
Figure 19:
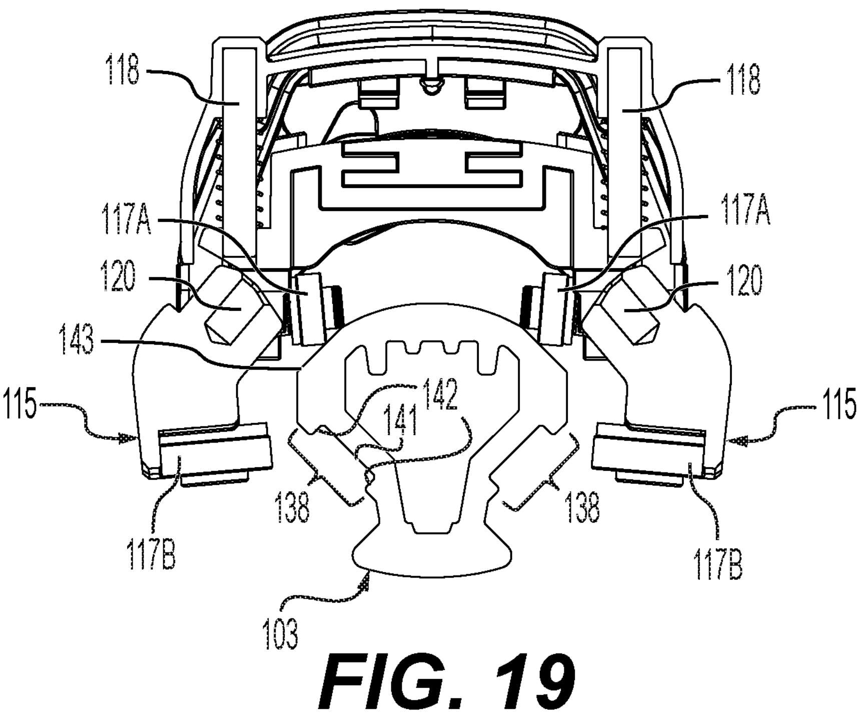
FIG. 19 shows an end cross-sectional view of the trolley of the second embodiment disengaged from the rail.

As illustrated in FIGS. 14 to 16, the trolley 100 may comprise a fall arrest indicator wherein the connection arm 104 defines an integrated fail-safe feature comprising a sacrificial frail edge 131 as shown in FIG. 16. As such and as shown in FIGS. 14 and 15, if excessive force is applied in the event of a fall arrest situation to the connection arm 104 by the twist lock carabiner 107 or the like, the integral sacrificial frail edge 131 deforms thereby creating a visible deformation 132. When a visible deformation 132 occurs as such, the trolley 100 may be inspected for damage and the connection arm 104 replaced by disengaging the two side retention allen screws 133 thereof.

FIGS. 17-23 show the trolley 100 and rail 103 in accordance with a second embodiment.

In accordance with a second embodiment, the pivot arms 115 retain both upper bearings 117A and lower bearings 117B. In the open configuration shown in FIG. 19, the pivot arms 115 are open so that corners of the upper bearings 117A contact an upper surface of the rail 103 whereas the lower bearings 117B are open out away from under the rail head upper portion 128. However, in the closed configuration shown in FIG. 18, the pivot arms 115 are closed so that the upper bearings 117A lie flat across the upper surface of the rail 103 and the lower bearings 117B engage under the rail head upper portion 128.

The bearings 117 may engage the pivot arms 115 by screws 134 and washers 135 may interface the bearings 117 and the pivot arms 115. A coil spring 137 may bias the side arms 115 open.

When in the closed configuration, faces of the upper bearings 117A may be at approximately 90° with respect to those of respective lower bearings 117B so that the bearings 117 quadrilaterally entrap the rail 103.

In the open configuration, pressing the chassis 105 against the rail 103 applies force against to the upper bearings 117A, thereby causing the pivot arms 115 to pivot inwardly.

Further in accordance with a second embodiment, the rail 103 comprises side under channels 138 formed either side of the rail head upper portion 128. As shown, the channels 138 may be defined by a planar floor 141 and substantially orthogonal sides 142 recessed within opposite sides of the rail head upper portion 128. The floors 141 of the respective channels 138 may be at approximately 90° with respect to each other and furthermore approximately 90° with respect to a corresponding upper planar surface 143 of the rail 103.

The rail 103 of the second embodiments may further comprise a longer neck between the rail head upper portion 128 and the rail base lower portion 129 as compared to the first embodiment shown in FIG. 1.

The lower bearings 117B may be larger than the upper bearings 117A.

The braking mechanism of the second embodiment may be simplified wherein the manual braking lever 125 itself is pivotally coupled to the chassis 101 by screw 144 defining a pivot point 145. The head of the manual braking lever 125 defines a generally straight non-engaging profile 140 and a rounded engaging profile 139.

Figure 20:
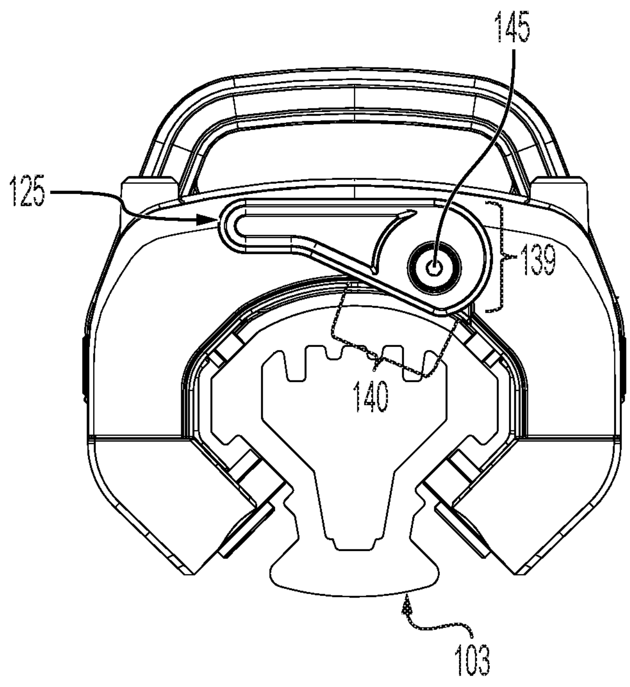
FIG. 20 shows an end cross-sectional view of a braking mechanism of the trolley of the second embodiment not engaging the rail.

The non-engaging profile 140 is closer to the pivot point 145 as compared to the rounded engaging profile 139. As such, as shown in FIG. 20, when the braking mechanism is not locked, the non-engaging profile 140 is towards the upper surface of the rail 103, thereby not frictionally engaging the rail 103.

Figure 21:
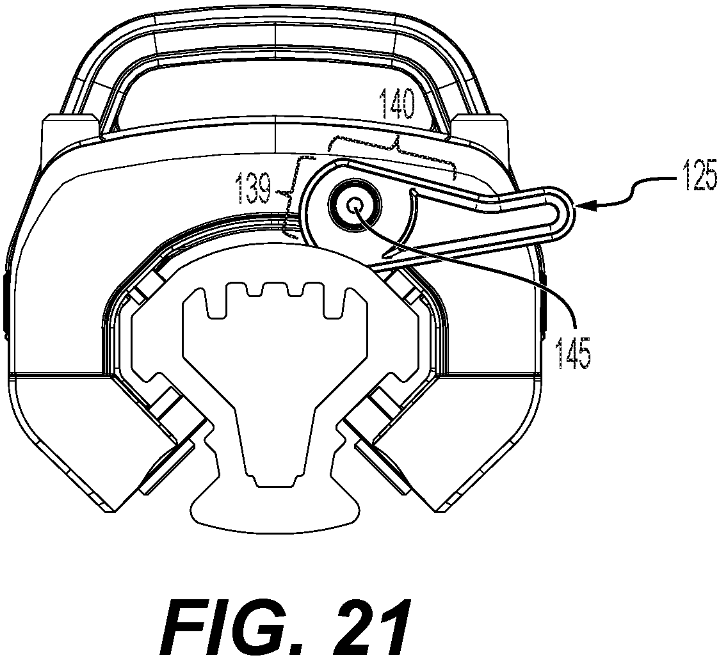
FIG. 21 shows an end cross-sectional view of a braking mechanism of the trolley of the second embodiment frictionally engaging the rail.
Figure 22:
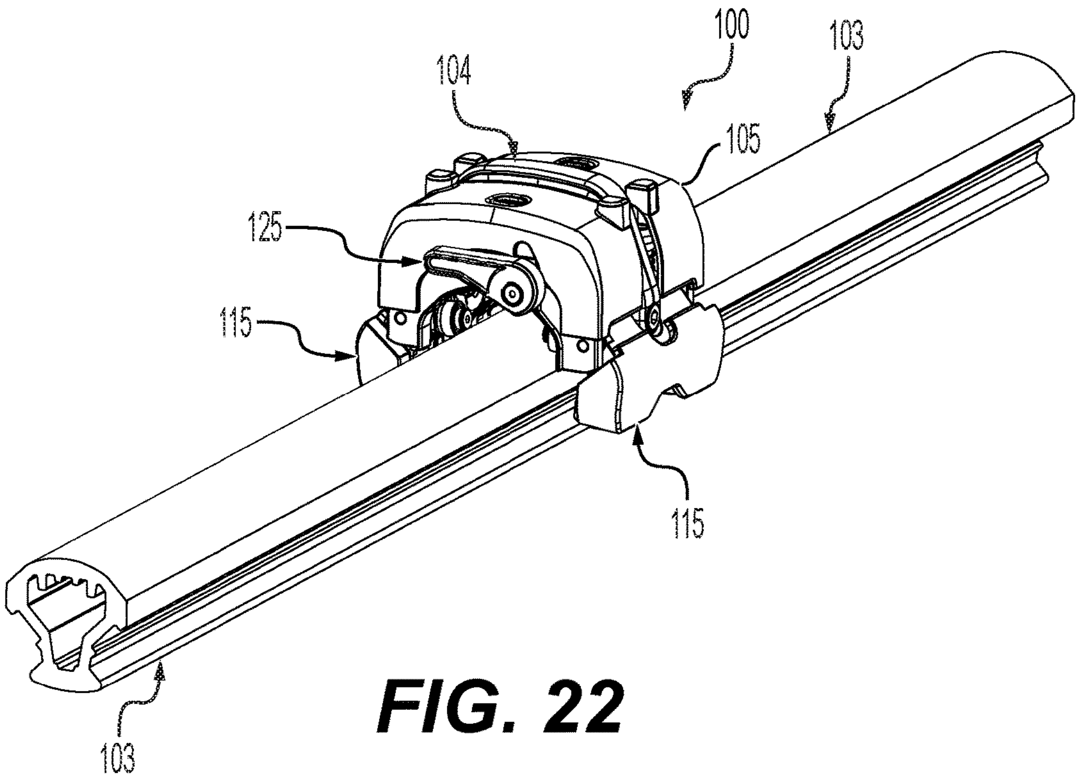
FIG. 22 shows an perspective view of the trolley of the second embodiment disengaged from the rail.
Figure 23:
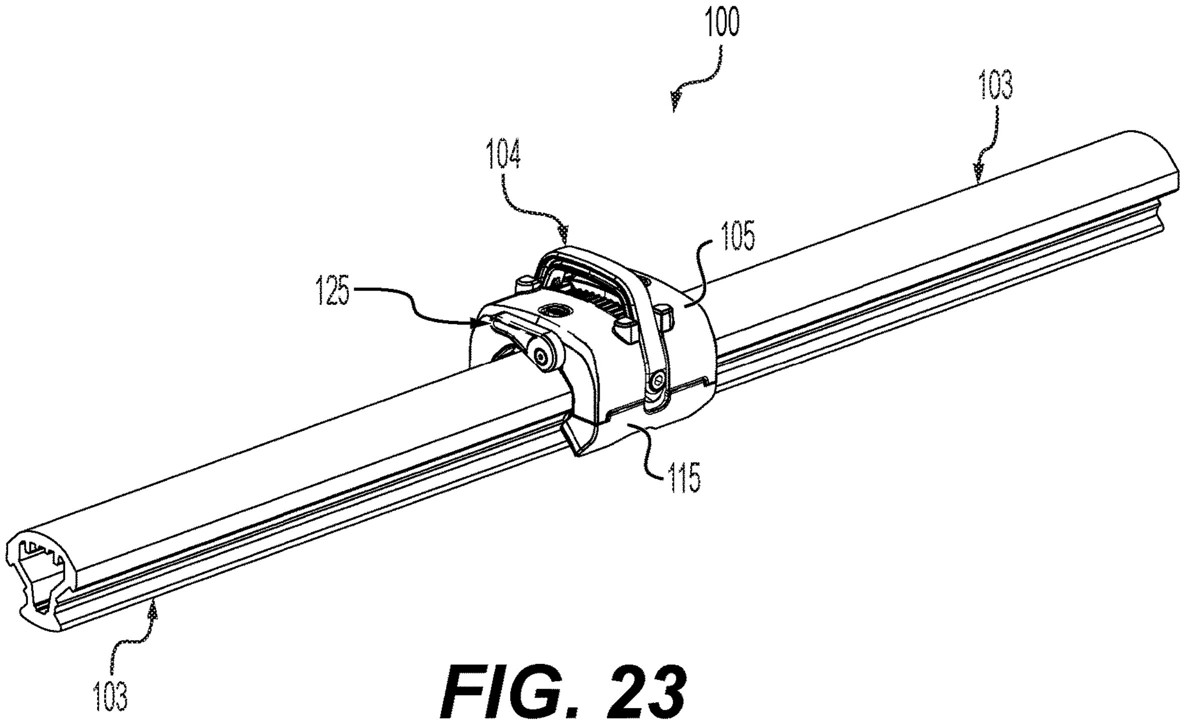
FIG. 23 shows an perspective view of the trolley of the second embodiment engaging the rail.

However, when the handle 125 is thrown over in the manner shown in FIG. 21, the engaging profile 139 is brought to bear against the upper surface of the rail 103, thereby frictionally engaging the rail 103 and thereby preventing the travel of the trolley with respect to the rail 103. The rounded engaging profile 139 may gradually increase in radius from the non-engaging profile 140 so that frictional engagement may be proportionately controlled by the angle of the handle 125.

Further in accordance with the second embodiment, the safety latches 110 may be centrally located with respect to the chassis 101 and clip body 105, yet work in the same manner whereby the safety latches 110 are slidably retained within elongate apertures 114 between engaged and non-engaged positions. In this case, the elongate apertures 114 are aligned along the length of the rail 103. Extension springs may bias the safety latches 110 to the engaged position so that the latch is 110 automatically engage when the clip body 105 moves to the engagement position.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilise the invention and various embodiments, with various modifications as are suited to the particular use contemplated. It is intended that the following claims and their equivalents define the scope of the invention.

The invention claimed is:

1. A height safety trolley comprising:
- a main chassis;
- a clip body;
- a rail engagement mechanism configurable in use in a rail engagement position to engage a rigid rail and a rail disengagement position to disengage the rigid rail; and
- a connection arm connected to the main chassis, wherein:
  - the clip body moves relative to the connection arm between:
    - an engagement position wherein the clip body securely holds the rail engagement mechanism in the rail engagement position; and
    - a disengagement position wherein the clip body allows the rail engagement mechanism to assume the rail disengagement position.

2. The trolley as claimed in claim 1, wherein the clip body and the connection arm define a functional gap therebetween, and wherein the rail engagement mechanism cannot assume the rail disengagement position if the functional gap is greater than a threshold.

3. The trolley as claimed in claim 2, wherein the connection arm and the clip body define substantially parallel interfacing surfaces across the trolley defining the functional gap therebetween.

4. The trolley as claimed in claim 1, further comprising a safety latch operably interfacing the clip body and the main chassis to lock the clip body in the engagement position.

5. The trolley as claimed in claim 4, wherein the safety latch automatically engages when the clip body moves to the engagement position.

6. The trolley as claimed in claim 5, wherein the safety latch requires manual disengagement to allow the clip body to move to the disengagement position.

7. The trolley as claimed in claim 6, wherein the trolley comprises two safety latches which require simultaneous manual disengagement in opposite directions.

8. The trolley as claimed in claim 1, wherein the engagement mechanism comprise pivot arms pivotably coupled to the main chassis, which pivot inwards when the engagement mechanism is in the rail engagement position and which pivot outwards when the engagement mechanism is in the rail disengagement position.

9. The trolley as claimed in claim 8, wherein the pivot arms hold lower roller bearings and wherein the main chassis holds upper roller bearings.

10. The trolley as claimed in claim 8, wherein the pivot arms hold lower roller bearings and upper roller bearings.

11. The trolley as claimed in claim 8, wherein locking dowel pins are pushed by the clip body through main chassis guide channels into aligned pivot arm guide channels to securely hold the pivot arms in the rail engagement position.

12. The trolley as claimed in claim 11, wherein a plurality of extension springs affixed around the locking dowel pins bias the clip body towards the disengagement position.

13. The trolley as claimed in claim 12, wherein the clip body is movable with respect to the connection arm to define a functional gap therebetween, and wherein the distal ends of the locking dowel pins remain within the pivot arm guide channels if the functional gap is greater than a threshold.

14. The trolley as claimed in claim 1, further comprising a braking mechanism which frictionally engages the rigid rail in use to prevent the trolley from running therealong.

15. The trolley as claimed in claim 14, wherein the braking mechanism comprises a frictional rail brake arm movable with respect to the main chassis and a manual braking lever acting on a cam to bear the frictional rail brake arm against the rigid rail.

16. The trolley as claimed in claim 14, wherein the braking mechanism comprises a manual braking lever pivotally attached to the main chassis and defining a non-engaging profile and an engaging profile with respect to a pivot point thereof, the engaging profile extending further from the pivot point than the non-engaging profile so that the engaging profile engages the rail in use when the lever is thrown.

17. The trolley as claimed in claim 1, wherein the connection arm has a sacrificial frail edge which deforms when excessive load is applied thereto.

18. The trolley as claimed in claim 1, wherein the trolley defines a channel therethrough which is non-circular in cross-section.

19. The trolley as claimed in claim 18, wherein the rigid rail defines a rail head upper portion being non-circular in cross-section and conforming to the trolley channel.

20. The trolley as claimed in claim 19, wherein the rigid rail further defines a rail base lower portion to which rail mounted clamping brackets can be affixed in use to support the rail head upper portion.

21. The trolley as claimed in claim 19, wherein the rail defines under channels either side of the rail head upper portion.

22. The trolley as claimed in claim 19, wherein floors of the under channels are angled at approximately 90° apart.

23. The trolley as claimed in claim 19, wherein each under channel defines a floor being approximately 90° with respect to a corresponding planar surface of an upper surface of the rail head upper portion.

* * * * *